US008732424B2

(12) United States Patent
Lee et al.

(10) Patent No.: US 8,732,424 B2
(45) Date of Patent: May 20, 2014

(54) HYBRID STORAGE APPARATUS AND METHOD OF SHARING RESOURCES THEREIN

(75) Inventors: Ki-cheol Lee, Suwon-si (KR); Byung-wook Kim, Suwon-si (KR); Hwa-jun Kim, Hwaseong-si (KR)

(73) Assignee: Seagate Technology International, Grand Cayman (KY)

( * ) Notice: Subject to any disclaimer, the term of this patent is extended or adjusted under 35 U.S.C. 154(b) by 642 days.

(21) Appl. No.: 12/683,690

(22) Filed: Jan. 7, 2010

(65) Prior Publication Data

US 2010/0172049 A1 Jul. 8, 2010

(30) Foreign Application Priority Data

Jan. 7, 2009 (KR) .................. 10-2009-0001242

(51) Int. Cl.
*G06F 13/00* (2006.01)
(52) U.S. Cl.
USPC .................... 711/166; 711/E12.084; 713/300
(58) Field of Classification Search
USPC ......................................................... 711/154
See application file for complete search history.

(56) References Cited

U.S. PATENT DOCUMENTS

| 5,717,907 | A | * | 2/1998 | Kuddes et al. ................ 713/500 |
| 5,754,837 | A | * | 5/1998 | Walsh et al. .................. 713/500 |
| 6,085,332 | A | * | 7/2000 | El-Batal ....................... 714/5.11 |
| 6,519,713 | B1 | * | 2/2003 | Wada ............................... 714/23 |
| 7,809,886 | B2 | * | 10/2010 | Ashmore et al. .............. 711/114 |
| 8,037,368 | B2 | * | 10/2011 | Lee ................................. 714/56 |
| 2007/0233988 | A1 | * | 10/2007 | Adusumilli ................... 711/166 |
| 2008/0147964 | A1 | * | 6/2008 | Chow et al. .................. 711/103 |
| 2008/0288714 | A1 | * | 11/2008 | Salomon et al. .............. 711/103 |
| 2009/0287896 | A1 | * | 11/2009 | Adusumilli ................... 711/166 |

FOREIGN PATENT DOCUMENTS

| JP | 09-297659 | 11/1997 |
| JP | 2000-207294 | 7/2000 |
| JP | 2003-058325 | 2/2003 |

* cited by examiner

*Primary Examiner* — Sean D Rossiter
(74) *Attorney, Agent, or Firm* — Cesari & Reed, LLP; Kirk A. Cesari; Christian W. Best

(57) ABSTRACT

A hybrid storage apparatus having a plurality of storage devices and a method of sharing resources therein. The hybrid storage apparatus can include a plurality of storage device controllers to respectively control a plurality of storage devices that employ different writing methods, a system controller to exchange information with the storage device controllers such that the plurality of storage devices are controlled in one system and in an integrated manner, a reset signal generation unit to output a reset signal that is in a first logic state via an output terminal when a power supply voltage used in the system is equal to or greater than a reference voltage, and a connection unit to electrically connect the output terminal of the reset signal generation unit to a reset signal input terminal of the system controller and to reset signal input terminals of the storage device controllers.

20 Claims, 9 Drawing Sheets

HYBRID STORAGE APPARATUS AND METHOD OF SHARING RESOURCES THEREIN

CROSS-REFERENCE TO RELATED APPLICATIONS

This application claims priority under Korean Patent Application No. 10-2009-0001242, filed on Jan. 7, 2009, in the Korean Intellectual Property Office, the disclosure of which is incorporated herein in its entirety by reference.

BACKGROUND

1. Field of the Invention

The present general inventive concept relates to a data storage apparatus and a method of controlling the same, and more particularly, to a hybrid storage apparatus having a plurality of storage devices and a method of sharing resources in the hybrid storage apparatus.

2. Description of the Related Art

In general, a data storage apparatus includes a single storage device and is connected to a host apparatus in order to store or read data in response to a command from the host apparatus.

Hybrid storage apparatuses including a plurality of storage devices have recently been developed in order to increase storage capacity or data processing speed. However, when a plurality of storage devices are simply physically combined with one another in a hybrid storage apparatus, resources are likely to be wasted and the performance of the hybrid storage apparatus is likely to not be optimized. Accordingly, there is a need to develop a method of efficiently using resources in hybrid storage apparatuses to improve the performance thereof.

SUMMARY

The present general inventive concept provides a hybrid storage apparatus in which common resources are efficiently utilized and disposed.

The present general inventive concept also provides a method of sharing resources in a hybrid storage apparatus which is designed in such a manner that common resources are disposed to be shared by a plurality of storage devices included in the hybrid storage apparatus.

Additional embodiments of the present general inventive concept will be set forth in part in the description which follows and, in part, will be obvious from the description, or may be learned by practice of the general inventive concept.

Example embodiments of the present general inventive concept may be achieved by providing a hybrid storage apparatus including a plurality of storage device controllers to respectively control a plurality of storage devices that employ different writing methods, a system controller to exchange information with the storage device controllers such that the plurality of storage devices are controlled in one system and in an integrated manner, a reset signal generation unit to output a reset signal that is in a first logic state via an output terminal when a power supply voltage used in the system is equal to or greater than a reference voltage, and a connection unit to electrically connect the output terminal of the reset signal generation unit to a reset signal input terminal of the system controller and to reset signal input terminals of the storage device controllers.

The storage device controllers may include a hard disc drive controller and a non-volatile memory controller.

The reset signal generation unit may generate the reset signal that is in the first logic state when a power supply voltage applied to the storage device controllers and the system controller is equal to or greater than a first predetermined reference voltage and when a power supply voltage applied to a motor drive circuit used in one of the plurality of storage devices is equal to or greater than a second predetermined reference voltage.

The reset signal generation unit may include a comparator to compare a power supply voltage that is commonly applied to the storage device controllers and the system controller to the reference voltage, and to generate the reset signal that is in the first logic state when the power supply voltage is equal to or greater than the reference voltage, and a delayer to delay the reset signal received from the comparator for a predetermined time, and to output the delayed reset signal.

The reset signal generation unit may include a first comparator to compare a power supply voltage being commonly applied to the storage device controllers and the system controller to a first reference voltage and generate the first signal that is in the first logic state when the power supply voltage is equal to or greater than the first reference voltage, a first delayer to delay the first signal received from the first comparator for a first predetermined time and to output the delayed first signal, a second comparator to compare a power supply voltage applied to a motor drive circuit used in one of the plurality of storage devices to a second reference voltage and to generate a second signal that is in the first logic state only when the power supply voltage supplied to the motor drive circuit is equal to or greater than the second reference voltage, a second delayer to delay the second signal received from the second comparator for a second predetermined time and to output the delayed second signal, and an AND gate circuit to output a reset signal that is in the first logic state when both the first signal and the second signal are in the first logic state.

The power supply voltage applied to the motor drive circuit may include a power supply voltage applied to a spindle motor drive circuit of a hard disc drive.

The reset signal generation unit may be included in a combo integrated circuit of a hard disc drive that constitutes the plurality of storage devices.

A delay circuit may be included between the output terminal of the reset signal generation unit and the reset signal input terminals of the system controller or the storage device controllers.

Example embodiments of the present general inventive concept may also be achieved by providing a method of sharing resources in a hybrid storage apparatus including a plurality of storage devices, wherein on a printed circuit board assembly of the hybrid storage apparatus, a reset signal generation circuit is disposed in an integrated circuit of one storage device from among the plurality of storage devices and a reset signal output terminal of the integrated circuit including the reset signal generation circuit is electrically connected to reset signal input terminals of a plurality of controllers included in the hybrid storage apparatus.

A delay circuit may be included between the reset signal output terminal of the integrated circuit including the reset signal generation circuit and the reset signal input terminals of the plurality of controllers.

Example embodiments of the present general inventive concept may also be achieved by providing a hybrid storage apparatus including a plurality of storage devices having different data writing methods, a system controller to communicate read or write commands from a host device to the plurality of storage devices, and a reset signal generation unit to simultaneously apply a reset signal to the plurality of storage devices and the system controller to perform the read or write command with respect to one of the plurality of storage devices.

The reset signal generation unit can include a comparator to compare a power supply voltage commonly applied to the plurality of storage devices and the system controller to a predetermined reference voltage and to generate the reset signal when the power supply voltage is equal to or greater than the predetermined reference voltage, and a delayer to delay the reset signal applied to the plurality of storage devices and the system controller according to a ready-time of the plurality of storage devices and the system controller.

The hybrid storage may further include a first delayer to delay the reset signal applied to the system controller according to a ready-time of the system controller, and a second delayer to delay the reset signal applied to one or more storage devices according to a ready-time of the one or more storage devices.

The reset signal generation unit may be disposed in one of the plurality of storage devices having the shortest ready-time from among all the storage devices.

The reset signal generation unit may include a first comparator to compare a first power supply voltage commonly applied to the plurality of storage devices and the system controller to a first predetermined reference voltage to generate a first signal having a first logic state when the first power supply voltage is equal to or greater than the first predetermined reference voltage, a second comparator to compare a second power supply voltage applied to a motor drive circuit of one of the storage devices to a second predetermined reference voltage to generate a second signal having a second logic state when the second power supply voltage is equal to or greater than the second predetermined reference voltage, and a gate circuit to receive the first and second signals and to output the reset signal to the plurality of storage devices and the system controller when the first logic state is the same as the second logic state.

Example embodiments of the present general inventive concept may also be achieved by providing a method of controlling a hybrid storage apparatus, including communicating read or write commands from a host device to a plurality of storage devices having different read or write methods, and simultaneously applying a reset signal to the plurality of storage devices and the system controller to carry out the read or write command from the host device.

The operation of simultaneously applying the reset signal may include comparing a power supply voltage commonly applied to the plurality of storage devices and the system controller to a predetermined reference voltage, generating the reset signal when the power supply voltage is equal to or greater than the predetermined reference voltage, and delaying the reset signal applied to the plurality of storage devices and the system controller according to a ready-time of the plurality of storage devices and the system controller.

The method may further include delaying the reset signal applied to the system controller according to a ready-time of the system controller, and delaying the reset signal applied to one or more storage devices according to a ready-time of the one or more storage devices.

The operation of simultaneously applying the reset signal may include comparing a first power supply voltage commonly applied to the plurality of storage devices and the system controller to a first predetermined reference voltage to generate a first signal having a first logic state when the first power supply voltage is equal to or greater than the first predetermined reference voltage, comparing a second power supply voltage applied to a motor drive circuit of one of the storage devices to a second predetermined reference voltage to generate a second signal having a second logic state when the second power supply voltage is equal to or greater than the second predetermined reference voltage, and applying the reset signal to the plurality of storage devices and the system controller when the first logic state is the same as the second logic state.

Example embodiments of the present general inventive concept may also be achieved by providing a computer system including a storage device including a hard disc drive (HDD) and a non-volatile (NV) memory having different read and write methods, a system controller to communicate read or write commands to the HDD and NV memory, and a single reset signal generation unit to simultaneously apply a reset signal to the HDD and NV memory to perform a read or write command with respect to one of the HDD or NV memory according to a ready time of the HDD and the NV memory.

BRIEF DESCRIPTION OF THE DRAWINGS

These and/or other embodiments of the present general inventive concept will become apparent and more readily appreciated from the following description of the example embodiments, taken in conjunction with the accompanying drawings of which.

DETAILED DESCRIPTION OF THE EMBODIMENTS

Figure 1:
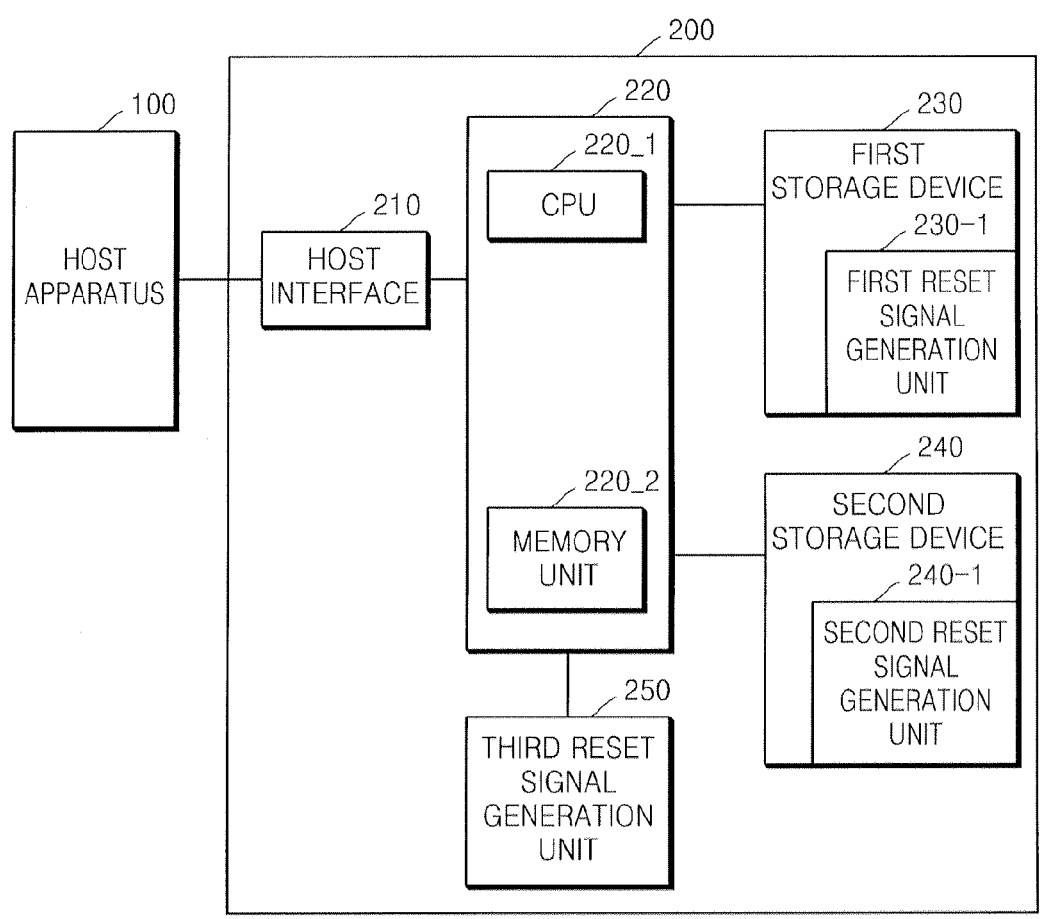
FIG. 1 is a block diagram of a data storage system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In accordance with exemplary embodiments of the present general inventive concept, a hybrid storage apparatus can include a plurality of storage devices each employed via various wiring methods, and the plurality of storage devices can each include their own controllers. Also, a hybrid storage apparatus according to example embodiments of the present general inventive concept can include a system controller capable of controlling a plurality of storage devices in the hybrid storage apparatus in an integrated manner.

In the example embodiments, a hybrid storage apparatus can include a plurality of controllers each having an input terminal to receive a reset signal. Here, the reset signal can be generated by continuously monitoring whether a power supply voltage is normally applied to a storage system. If the reset signal is generated, the reset signal can be applied to the controllers to indicate whether the controllers are to be operated.

A method of supplying a reset signal in a data storage system having a hybrid storage apparatus according to an example embodiment of the present general inventive concept will now be described with reference to FIG. 1.

FIG. 1 is a block diagram of a data storage system to perform a method in accordance with an example embodiment of the present general inventive concept. Referring to FIG. 1, the data storage system includes a host apparatus 100 and a hybrid storage apparatus 200.

As illustrated in FIG. 1, the hybrid storage apparatus 200 includes a host interface 210, a system controller 220, a first storage device 230, a second storage device 240, and a third reset signal generation unit 250.

The system controller 220 can include a central processing unit (CPU) 220-1 and a memory unit 220-2. The CPU 220-1 is configured to control the hybrid storage apparatus 200, and to control a series of operations that include, for example, interpreting commands and calculating and comparing data. The memory unit 220-2 stores programs and data which are used to control the hybrid storage apparatus 200.

The first storage device 230 and the second storage device 240 can be non-volatile (NV) storage devices in which stored data is retained even when power is cut off. A writing method employed by the first storage device 230 may be different from that employed by the second storage device 240. In the example embodiments, the first storage device 230 is embodied as a hard disc drive (HDD) and the second storage device 240 is embodied as an NV semiconductor memory device, although it is possible that other known or later developed memory devices could also be used. For convenience of explanation, the hybrid storage apparatus 200 of the example embodiments is described as including two storage devices. However, the present general inventive concept is not limited to any particular number or type of storage devices, and it is possible that the hybrid storage apparatus 200 of the present general inventive concept may be designed to include three or more storage devices.

For example, the second storage device 240 may be any known or later developed NV semiconductor memory, such as flash memory, phase change random access memory (PRAM), ferroelectric RAM (FRAM), or magnetic RAM (MRAM).

Referring to FIG. 1, the host interface 210 communicates with the host apparatus 100 and exchanges data with the host apparatus 100 according to, for example, integrated drive electronics (IDE) interface standards. In the example embodiment of FIG. 1, the first storage device 230 and the second storage device 240 of the hybrid storage apparatus 200 can exchange data with the host apparatus 100 via a single host interface, i.e., the host interface 210.

The CPU 220-1 of the system controller 220 is capable of integrating the first storage device 230 and the second storage device 240 included in the hybrid storage apparatus 200 into a single storage device, assigning a logical block address (LBA) to the single storage device, and controlling access to the first storage device 230 and the second storage device 240 based on the assigned LBA.

The first storage device 230 and the second storage device 240 each includes a controller (not illustrated), and each includes a reset signal generation circuit in order to supply a reset signal to a reset signal input terminal of the controller.

For example, as illustrated in FIG. 1, a first reset signal generation unit 230-1 is disposed in the first storage device 230, and a second reset signal generation unit 240-1 is disposed in the second storage device 240.

Also, in order to supply a reset signal to the system controller 220, a third reset signal generation unit 250 can be disposed separate from the first reset signal generation unit 230-1 and the second reset signal generation unit 240-1 in communication with the system controller 220.

It is possible that a reset signal generation unit can be installed in each of the controllers of the hybrid storage apparatus 200 separately, but this may result in increased circuit size of separate components.

Moreover, reference voltages may not be the same for the reset signal generation units 230-1 and 240-1, and thus it is possible that only some of the controllers from among all the controllers in the hybrid storage apparatus 200 may normally operate due to the different reference voltages, thereby causing the hybrid storage apparatus 200 to malfunction.

Accordingly, a method of supplying a reset signal in a data storage system having a hybrid storage apparatus according to another embodiment of the present general inventive concept will now be described with reference to FIG. 2.

Figure 2:
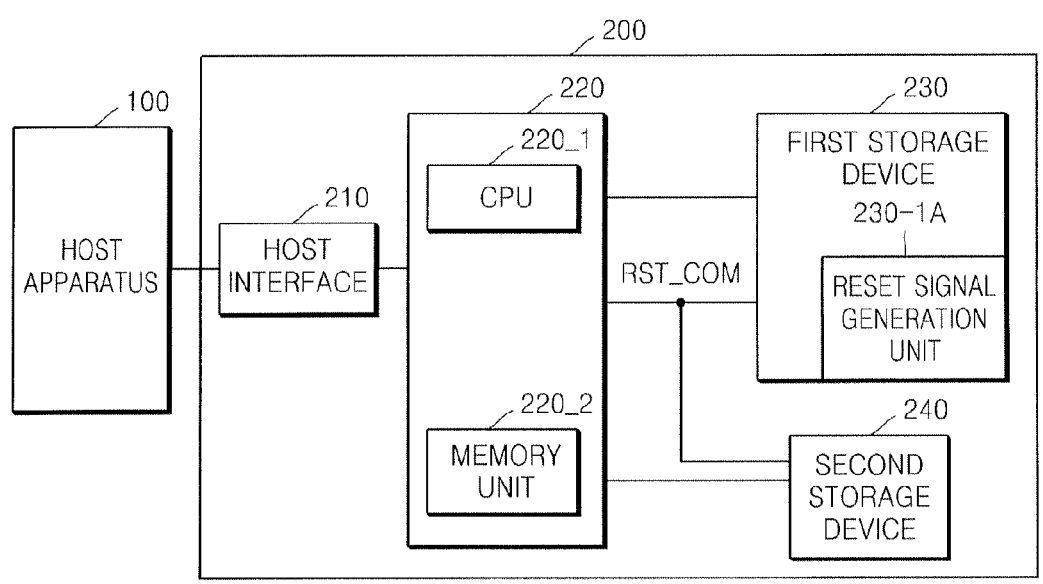
FIG. 2 is a block diagram of a data storage system according to another embodiment of the present general inventive concept.

FIG. 2 is a block diagram of a data storage system to perform a method according to another embodiment of the present general inventive concept. Referring to FIG. 2, the data storage system includes a host apparatus 100 and a hybrid storage apparatus 200.

As illustrated in FIG. 2, the hybrid storage apparatus 200 includes a host interface 210, a system controller 220, a first storage device 230, and a second storage device 240.

Basic operations of components of the hybrid storage apparatus 200 of FIG. 2 are the same as those of components of the hybrid storage apparatus 200 of FIG. 1 and thus a detailed description thereof will be omitted here for convenience of description.

In the hybrid storage apparatus 200 illustrated in FIG. 2, a reset signal generation unit is included in only one storage device from among a plurality of storage devices included in the hybrid storage apparatus 200, and the reset signal generation unit 230-1A is used to supply a reset signal to the storage devices 230, 240 and the system controller 220.

For example, in the hybrid storage apparatus 200 of FIG. 2, a reset signal generation unit 230-1A is included in the first storage device 230, but not in the second storage device 240, and a reset signal RST_COM output from the reset signal generation unit 230-1A is supplied to reset signal input terminals of the system controller 220 and the second storage device 240.

According to this method, since the hybrid storage apparatus 200 includes only a single reset signal generation unit, the circuit size of the hybrid storage apparatus 200 can be reduced. Also, the determination as to whether to operate controllers of the hybrid storage apparatus 200 can be made in response to a reset signal output from a single reset signal generation unit 230-1A, thus improving upon a situation in which some, but not all, controllers of the hybrid storage apparatus 200 may normally operate given the fact that reference voltages may not be the same among a plurality of reset signal generation units, as described above.

Figure 4:
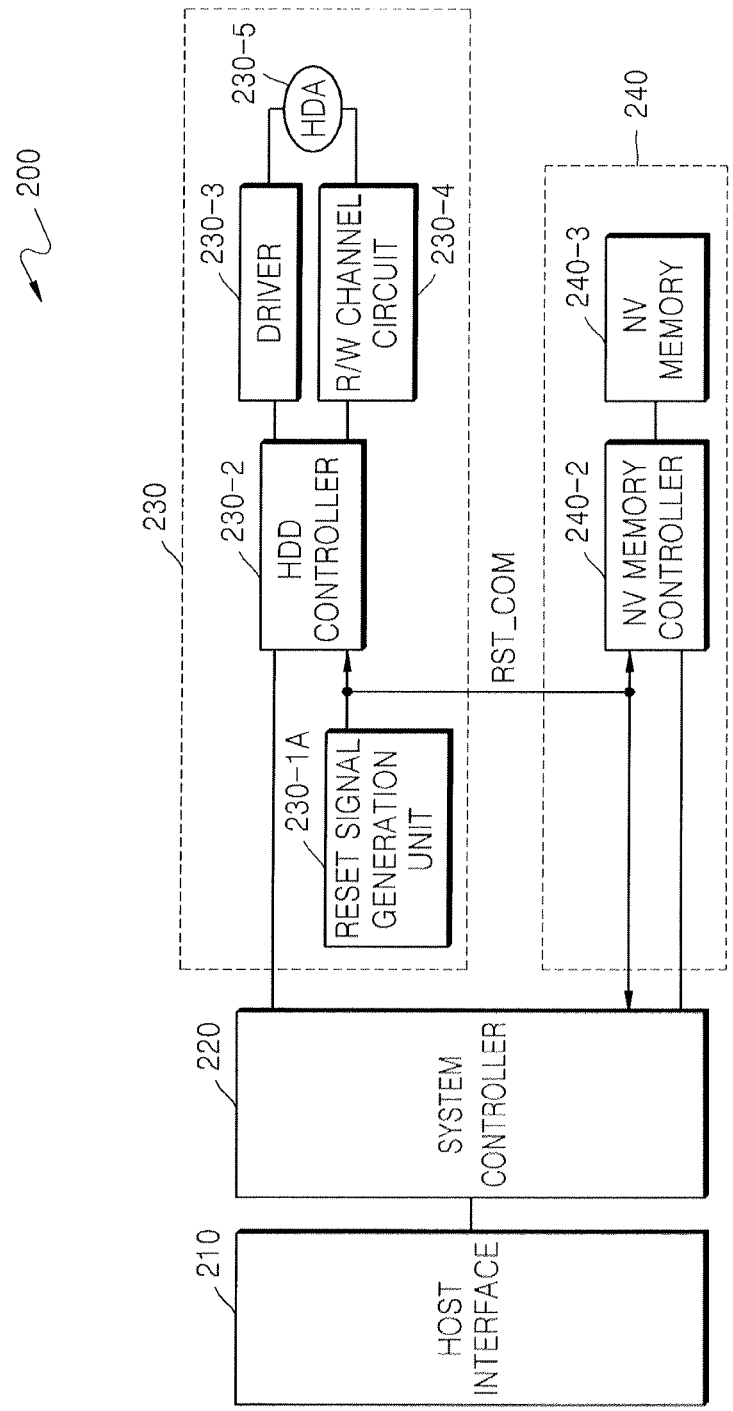
FIG. 4 is a block diagram illustrating in detail a hybrid storage apparatus included in the data storage system illustrated in FIG. 2.

FIG. 4 is a block diagram illustrating in detail the hybrid storage apparatus 200 included in the data storage system of FIG. 2, in which the first storage device 230 and the second storage device 240 are set as an HDD and an NV semiconductor memory device, respectively. The NV semiconductor memory device may also be referred to as a solid state drive (SSD).

As illustrated in FIG. 4, the first storage device 230 can include a reset signal generation unit 230-1A, an HDD controller 230-2, a driver 230-3, a read/write (R/W) channel circuit 230-4, and a head disc assembly (HDA) 230-5. The second storage device 240 can include an NV memory controller 240-2 and a NV memory 240-3.

In the example embodiment of FIG. 4, the reset signal generation unit 230-1A outputs a reset signal RST_COM that is in a first logic state via an output terminal (not illustrated) when a power supply voltage used in the hybrid storage apparatus 200 is equal to or greater than a reference voltage.

The output terminal of the reset signal generation unit 230-1A is electrically connected to reset signal input terminals (not illustrated) of the HDD controller 230-2, the NV memory controller 240-2, and the system controller 220.

Thus, whether to operate the HDD controller 230-2, whether to operate the NV memory controller 240-2, and whether to operate the system controller 220 can be simultaneously determined in response to the reset signal RST_COM output from the reset signal generation unit 230-1A.

That is, the HDD controller 230-2, the NV memory controller 240-2, and the system controller 220 each operate when the reset signal RST_COM is supplied in the first logic stage to the reset signal input terminals thereof, and do not operate otherwise.

Accordingly, when the power supply voltage used in the hybrid storage apparatus 200 is equal to or greater than the reference voltage, the HDD controller 230-2, the NV memory controller 240-2 and the system controller 220 simultaneously operate, and then, when the power supply voltage is less than the reference voltage, they are simultaneously shut off.

Figure 9:
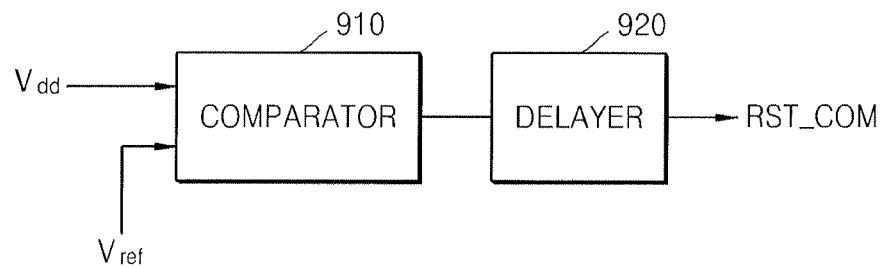
FIG. 9 is a block diagram illustrating in detail a reset signal generation unit included in a data storage system according to an embodiment of the present general inventive concept.

FIG. 9 is a block diagram illustrating in detail the reset signal generation unit 230-1A according to an embodiment of the present general inventive concept.

As illustrated in FIG. 9, the reset signal generation unit 230-1A may include a comparator 910 and a delayer 920.

In this example embodiment, the comparator 910 compares a power supply voltage Vdd and a reference voltage Vref that are used in the HDD controller 230-2, the NV memory controller 240-2, and the system controller 220 illustrated in FIG. 4, and outputs a reset signal RST_COM that is in a first logic state when the power supply voltage Vdd is equal to or greater than the reference voltage Vref. The first logic state may be logic high. The reference voltage Vref may be the lowest level of the power supply voltage that permits the HDD controller 230-2, the NV memory controller 240-2, and the system controller 220 to normally operate.

Here, the delayer 920 delays a rising period of and a falling period of a signal received from the comparator 910. A delay in the rising period is determined to be greater than a delay in the falling period. The delay in the rising period is determined to be a time interval corresponding to an initial ready-time during which the power supply voltage is applied to the HDD controller 230-2, the NV memory controller 240-2, and the system controller 220 to normally operate them. The delay in the falling period is determined to be as short as possible and is determined to be much less than the delay in the rising period.

The delayed reset signal RST_COM that is output from the delayer 920 can be simultaneously supplied to the reset signal input terminals of the HDD controller 230-2, the NV memory controller 240-2, and the system controller 220.

Figure 10:
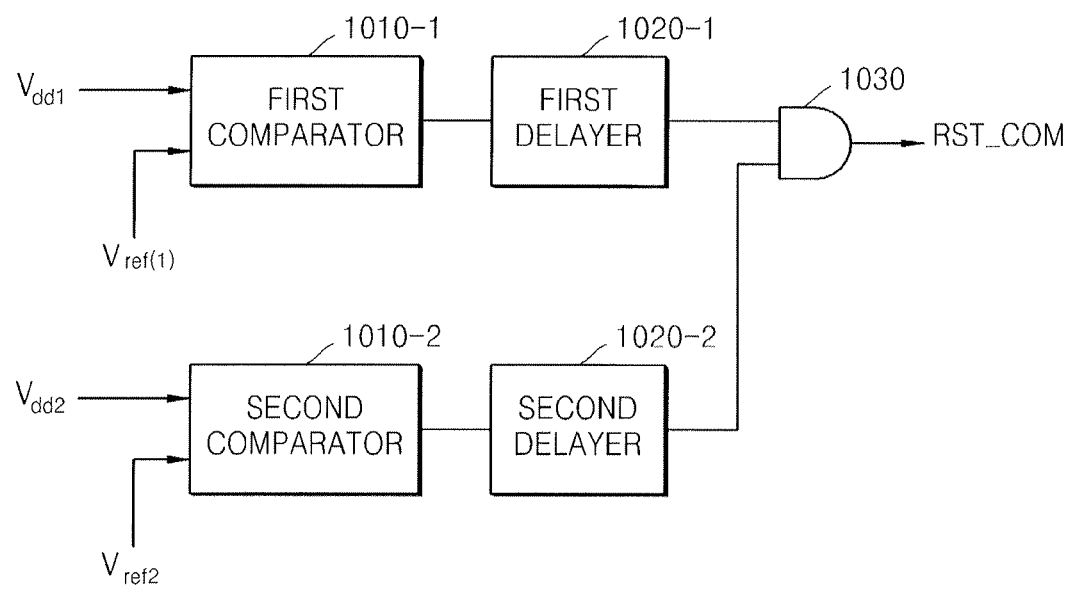
FIG. 10 is a block diagram illustrating in detail a reset signal generation unit included in a data storage system according to another embodiment of the present general inventive concept.

FIG. 10 is a block diagram illustrating in detail the reset signal generation unit 230-1A according to another embodiment of the present general inventive concept.

As illustrated in FIG. 10, the reset signal generation unit 230-1A may include a first comparator 1010-1, a first delayer 1020-1, a second comparator 1010-2, a second delayer 1020-2, and an AND gate circuit 1030.

Referring to FIG. 9, as described above, the reset signal RST_COM is generated by monitoring a power supply voltage applied to the HDD controller 230-2, the NV memory controller 240-2, and the system controller 220. However, referring to FIG. 10, a reset signal RST_COM is generated by monitoring both a power supply voltage applied to the HDD controller 230-2, the NV memory controller 240-2, and the system controller 220 and a power supply voltage applied to a motor drive circuit of a HDD (not illustrated).

That is, as illustrated in FIG. 10, the first comparator 1010-1 compares a first power supply voltage Vdd1 applied to the HDD controller 230-2, the NV memory controller 240-2, and the system controller 220 to a first reference voltage Vref 1, and outputs a first signal that is in a first logic state when the first power supply voltage Vdd1 is equal to or greater than the first reference voltage Vref1. The first logic state may be logic high, and may be determined to be the lowest level of the power supply voltage that permits the HDD controller 230-2, the NV memory controller 240-2, and the system controller 220 to normally operate.

Referring to FIG. 10, the first delayer 1020-1 delays a rising period of and a falling period of a signal received from the first comparator 1010-1. A delay in the rising period is determined to be greater than a delay in the falling period. The delay in the rising period is determined to be a time interval corresponding to an initial ready-time during which the power supply voltage is applied to the HDD controller 230-2, the NV memory controller 240-2, and the system controller 220 to normally operate them. The delay in the falling period is determined to be as short as possible and is determined to be much less than the delay in the rising period.

The second comparator 1010-2 compares a second power supply voltage Vdd2 applied to the motor drive circuit of the HDD to a second reference voltage Vref2 and outputs a second signal that is in the first logic state when the second power supply voltage Vdd2 is equal to or greater than the second reference voltage Vref2. The first logic state may be logic high and the second reference voltage Vref2 may be determined to be the lowest level of the power supply voltage that permits the motor drive circuit of the HDD to normally operate. Here, the motor drive circuit of the HDD may be a spindle motor drive circuit.

The second delayer 1020-2 delays a rising period of and a falling period of a signal received from the second comparator 1010-2. A delay in the rising period is determined to be greater than a delay in the falling period. The delay in the rising period is determined to be a time interval corresponding to an initial ready-time during which the power supply voltage is applied to the motor drive circuit to normally operate the motor drive circuit. The delay in the falling period is determined to be as short as possible and is determined to be much less than the delay in the rising period.

The first signal output from the first delayer 1020-1 and the second signal output from the second delayer 1020-2 are supplied to an input terminal of the AND gate circuit 1030. The AND gate circuit 1030 outputs the delayed reset signal RST_COM that is in the first logic state only when both the first signal and the second signal outputs are in the first logic state (logic high).

The delayed reset signal RST_COM output from the AND gate circuit 1030 is simultaneously supplied to reset signal input terminals of the HDD controller 230-2, the NV memory controller 240-2, and the system controller 220.

Figure 6:
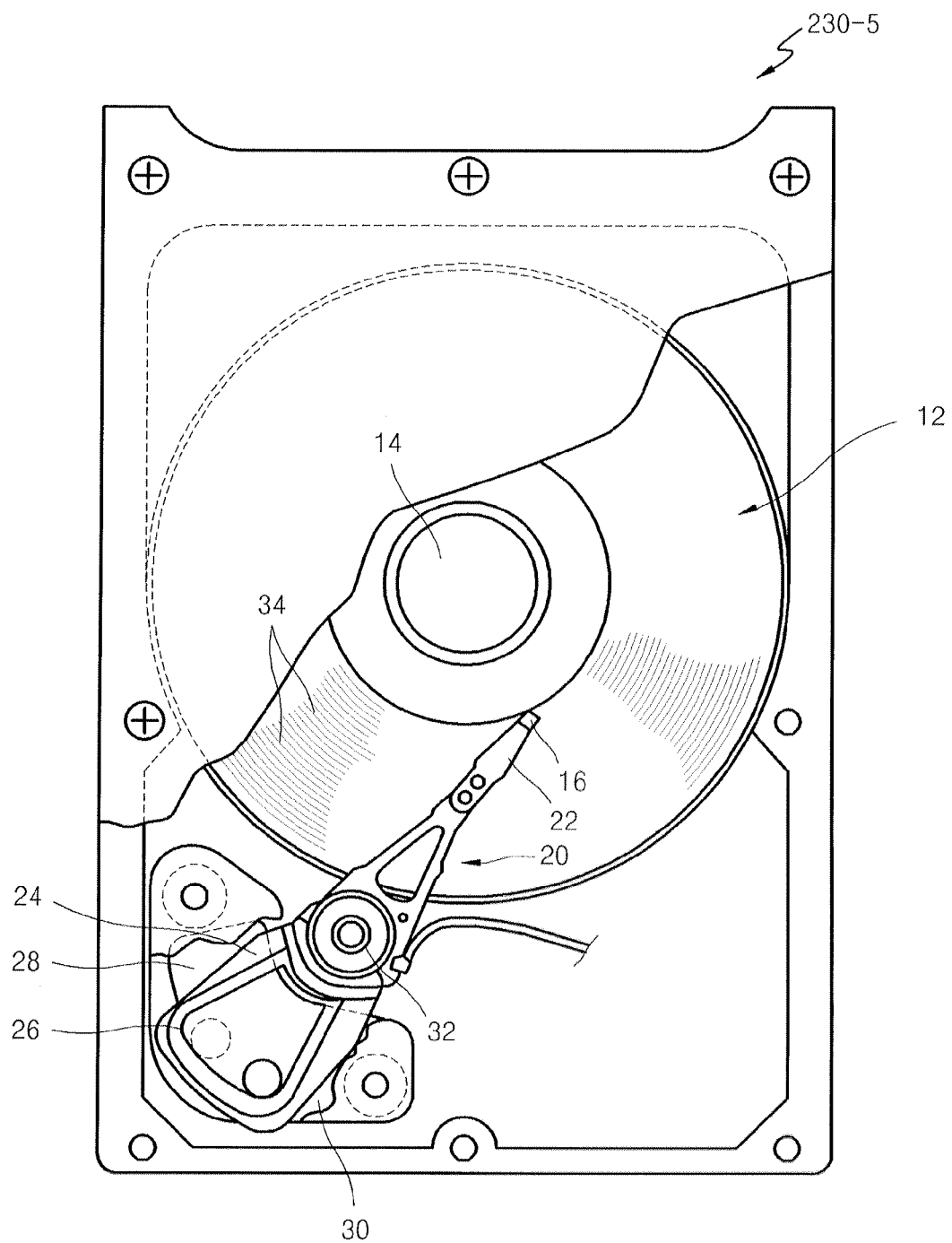
FIG. 6 is a plane view of a head disc assembly illustrated in FIG. 4 or 5 according to an embodiment of the present general inventive concept.

The construction of the HDA 230-5 illustrated in FIG. 4 is illustrated in detail in FIG. 6.

The HDA 230-5 includes at least one magnetic disc 12 that is rotated by a spindle motor 14. The HDA 230-5 includes a transducer 16 located adjacent to the surface of the disc 12.

The transducer 16 may sense and magnetize the magnetic field of the disc 12 in order to read information from or write information to the disc 12 when the disc 12 is rotating. In general, the transducer 16 is associated with the surface of the disc 12. Although FIG. 6 illustrates a single transducer, i.e., the transducer 16, it should be understood that the transducer 16 generally includes two separate transducers, i.e., a write transducer to write information to the disc by magnetizing the disc 12 and a read transducer to read information from the disc by sensing the magnetic field of the disc 12. The read transducer may be a magneto-resistive (MR) device. In general, the transducer 16 is referred to as a head or a magnetic head.

The transducer 16 may be united with a slider 20. The slider 20 is constructed to generate an air bearing between the transducer 16 and the surface of the disc 12. The slider 20 is coupled to a head gimbal assembly 22. The head gimbal assembly 22 is attached to an actuator arm 24 having a voice coil 26. The voice coil 26 is located adjacent to a magnetic assembly 28 in order to define a voice coil motor (VCM) 30. Current supplied to the voice coil 26 generates torque that allows the actuator arm 24 to pivot about a bearing assembly 32. The rotation of the actuator arm 24 moves the transducer 16 across the surface of the disc 12.

In general, information is stored in annular tracks 34 of the disc 12. Each of the annular tracks 34 has a plurality of sectors each including a data field and an identification field. The identification field includes gray code that identifies the sector and the annular track 34 (cylinder). An LBA is assigned to a recordable region of the disc 12. In a HDD, a recordable region of the recordable disc 12 is assigned by converting the LBA into cylinder/head/sector information.

Basic operations performed when the HDD controller 230-2, the NV memory controller 240-2 and the system controller 220 start to operate in response to the reset signal RST_COM received from the reset signal generation unit 230-1A, will now be described.

First, a read mode operation will be described with reference to FIGS. 4 and 6.

When receiving a read command via the host interface 210, the system controller 220 determines whether the first storage device 230 or the second storage device 240 is assigned LBAs indicated in the read command, based on LBA assignment information stored in the hybrid storage apparatus 200.

If the LBAs indicated in the read command are assigned to the first storage device 230 (HDD), the system controller 220 selects the first storage device 230 (HDD) and executes a data read mode.

That is, the HDD controller 230-2 calculates a cylinder-head-sector (CHS) value corresponding to the LBAs indicated in the read command based on the LBA assignment information, and outputs control signals to the driver 230-3 in order to move the transducer 16 to a target track 34 of the disc 12 corresponding to the CHS value.

The driver 230-3 generates driving current to be supplied to the spindle motor 14, which rotates the disc 12, and generates driving current to be supplied to the voice coil motor 30 that moves the transducer 16, based on the control signals received from the HDD controller 230-2.

If the transducer 16 arrives at the target track 34, which is selected using the CHS value, an electrical signal that is read from a sector of the target track 34 of the disc 12 by the transducer 16 is amplified by the R/W channel circuit 230-4, encoded into a digital signal, converted into stream data, and then is transmitted to the host apparatus 100 via the host interface 210.

If the LBAs indicated in the read command are assigned to the second storage device 240 (NV semiconductor memory device), the system controller 220 selects the second storage device 240 (NV semiconductor memory device) and executes the data read mode.

That is, the NV memory controller 240-2 calculates a physical memory block number (PBN) mapped to the LBAs indicated in the read command, based on the LBA assignment information, reads data from a location of the NV memory 240-3 corresponding to the PBN, and controls the data to be transmitted to the host apparatus 100 via the host interface 210.

Next, a write mode operation will be described with reference to FIGS. 4 and 6.

When receiving a write command via the host interface 210, the system controller 220 determines whether the first storage device 230 or the second storage device 240 is assigned LBAs indicated in the write command, based on the LBA assignment information stored in the hybrid storage apparatus 200.

If the LBAs indicated in the write command are assigned to the first storage device 230 (HDD), the system controller 220 selects the first storage device 230 (HDD) and executes a data write mode.

Then, the HDD controller 230-2 calculates a CHS value corresponding to the LBAs indicated in the write command based on the LBA assignment information, and controls the transducer 16 to be moved to a target track 34 of the disc 12 corresponding to the CHS value.

Next, data received via the host interface 210 is converted into a data stream that matches a write channel of the HDD 230 by the R/W channel circuit 230-4, the data stream is converted into a write current, and the transducer 16 writes data on the disc 12 by using the write current.

If the LBAs indicated in the write command are assigned to the second storage device 240 (NV semiconductor memory device), the system controller 220 selects the second storage device 240 (NV semiconductor memory device) and executes the data write mode.

That is, the NV memory controller 240-2 calculates a PBN mapped to the LBAs indicated in the write command, based on the LBA assignment information.

Data received via the host interface 210 is written to a location of the NV memory 240-3 that corresponds to the PBN.

As described above, an HDD and an NV semiconductor memory device included in the hybrid storage apparatus 200 individually operate as a single virtual storage device.

Since the HDD and the NV semiconductor memory devices individually operate as a single virtual storage device in the hybrid storage apparatus 200, the HDD controller 230-2, the NV memory controller 240-2, and the system controller 220 can be controlled in response to a single reset signal RST_COM, thereby preventing the hybrid storage apparatus 200 from malfunctioning due to controllers operating at different reference voltages.

Accordingly, a method of supplying a reset signal in a data storage system having a hybrid storage apparatus according to another embodiment of the present general inventive concept, will now be described with reference to FIG. 3.

Figure 3:
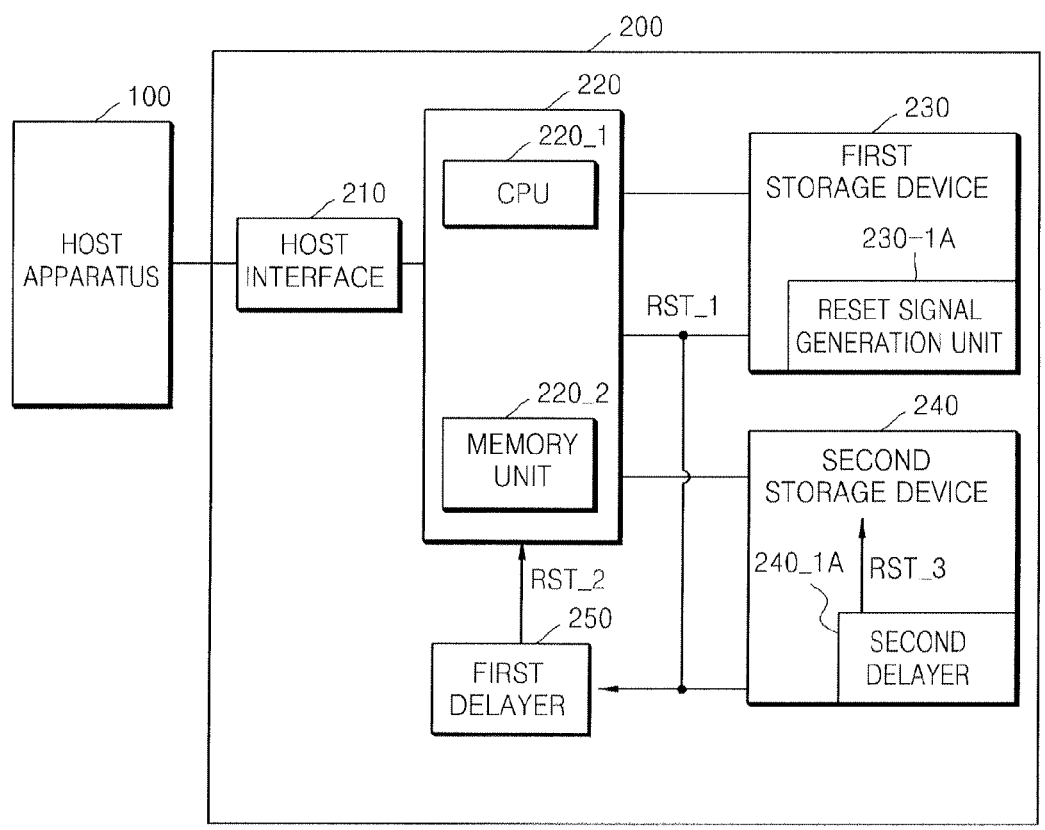
FIG. 3 is a block diagram of a data storage system according to another embodiment of the present general inventive concept.

FIG. 3 is a block diagram of a data storage system to perform a method according to another embodiment of the present general inventive concept. As illustrated in FIG. 3, the data storage system includes a host apparatus 100 and a hybrid storage apparatus 200.

In the example embodiment of FIG. 3, the hybrid storage apparatus 200 includes a host interface 210, a system controller 220, a first storage device 230, a second storage device 240, and a first delayer 250.

A reset signal generation unit 230-1A is disposed in the first storage device 230, and a second delayer 240-1A is disposed in the second storage device 240.

The reset signal generation unit 230-1A is disposed in the first storage device 230 having a HDD controller (not illustrated) that requires the shortest ready-time from among a plurality of controllers included in the hybrid storage apparatus 200. The first delayer 250 generates a reset signal RST_2 by delaying a reset signal RST_1 received from the reset signal generation unit 230-1A according to a ready-time of the system controller 220, and supplies the reset signal RST_2 to a reset signal input terminal of the system controller 220. Similarly, the second delayer 240-1A generates a reset signal RST_3 by delaying the reset signal RST_1 received from the reset signal generation unit 230-1A according to a read-time of a controller (not illustrated) included in the second storage device 240.

Figure 5:
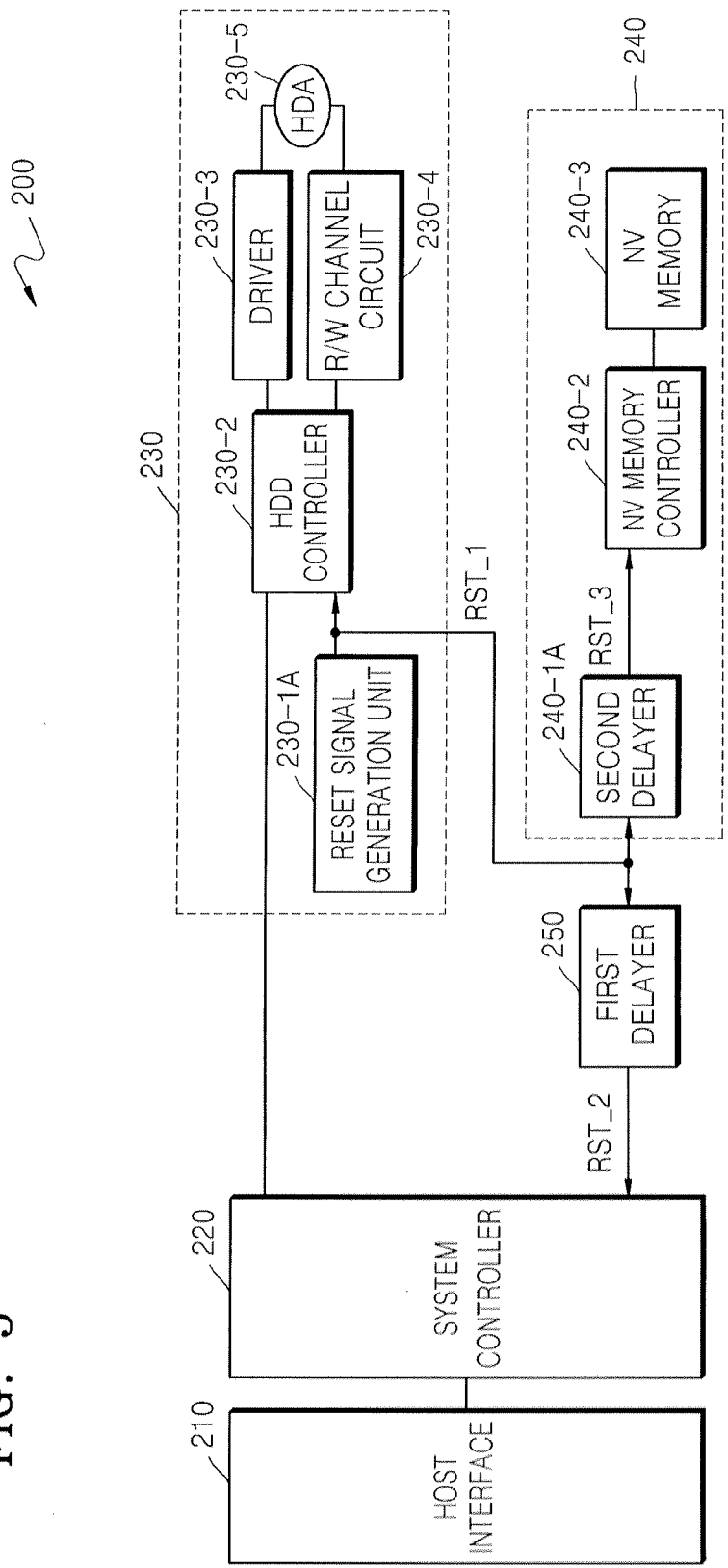
FIG. 5 is a block diagram illustrating in detail a hybrid storage apparatus included in the data storage system illustrated in FIG. 3.

FIG. 5 is a block diagram illustrating in detail a hybrid storage apparatus 200 included in the data storage system illustrated in FIG. 3, in which a first storage device 230 and a second storage device 240 are respectively set as an HDD semiconductor device and an NV semiconductor memory device.

Referring to FIG. 5, the first storage device 230 includes a reset signal generation unit 230-1A, an HDD controller 230-2, a driver 230-3, an R/W channel circuit 230-4, and an HDA 230-5. The second storage device 240 includes a second delayer 240-1A, an NV memory controller 240-2, and an NV memory 240-3. The hybrid storage apparatus 200 further includes a first delayer 250 that delays a reset signal to be supplied to the system controller 220.

A description of components of the hybrid storage apparatus 200 of FIG. 5 that are the same as those of the hybrid storage apparatus 200 illustrated in FIG. 4 will be omitted her for convenience of description. However, differences between the hybrid storage apparatus 200 of FIG. 5 and the hybrid storage apparatus 200 of FIG. 4 will be described here for clarification.

Referring to FIGS. 4 and 5, the hybrid storage apparatus 200 of FIG. 5 is substantially the same as the hybrid storage apparatus 200 of FIG. 4 in that a reset signal is supplied to all controllers of the hybrid storage apparatus 200 by using only one reset signal generation unit 230-1A. However, compared to the hybrid storage apparatus 200 of FIG. 4, the hybrid storage apparatus 200 of FIG. 5 further includes the first delayer 250 and the second delayer 240-1A in order to individually delay a reset signal RST_1 output from the reset signal generation unit 230-1A according to ready-times of the system controller 220 and the NV memory controller 240-2, respectively, thus enabling a single reset signal generation unit 230-1A to respectively supply individually delayed signals to the reset signal input terminals of the system controller 220 and the NV memory controller 240-2 via the associated first and second delayers, respectively.

Next, a method of disposing components in a hybrid storage apparatus in order to share resources according to an embodiment of the present general inventive concept will be described.

Figure 7:
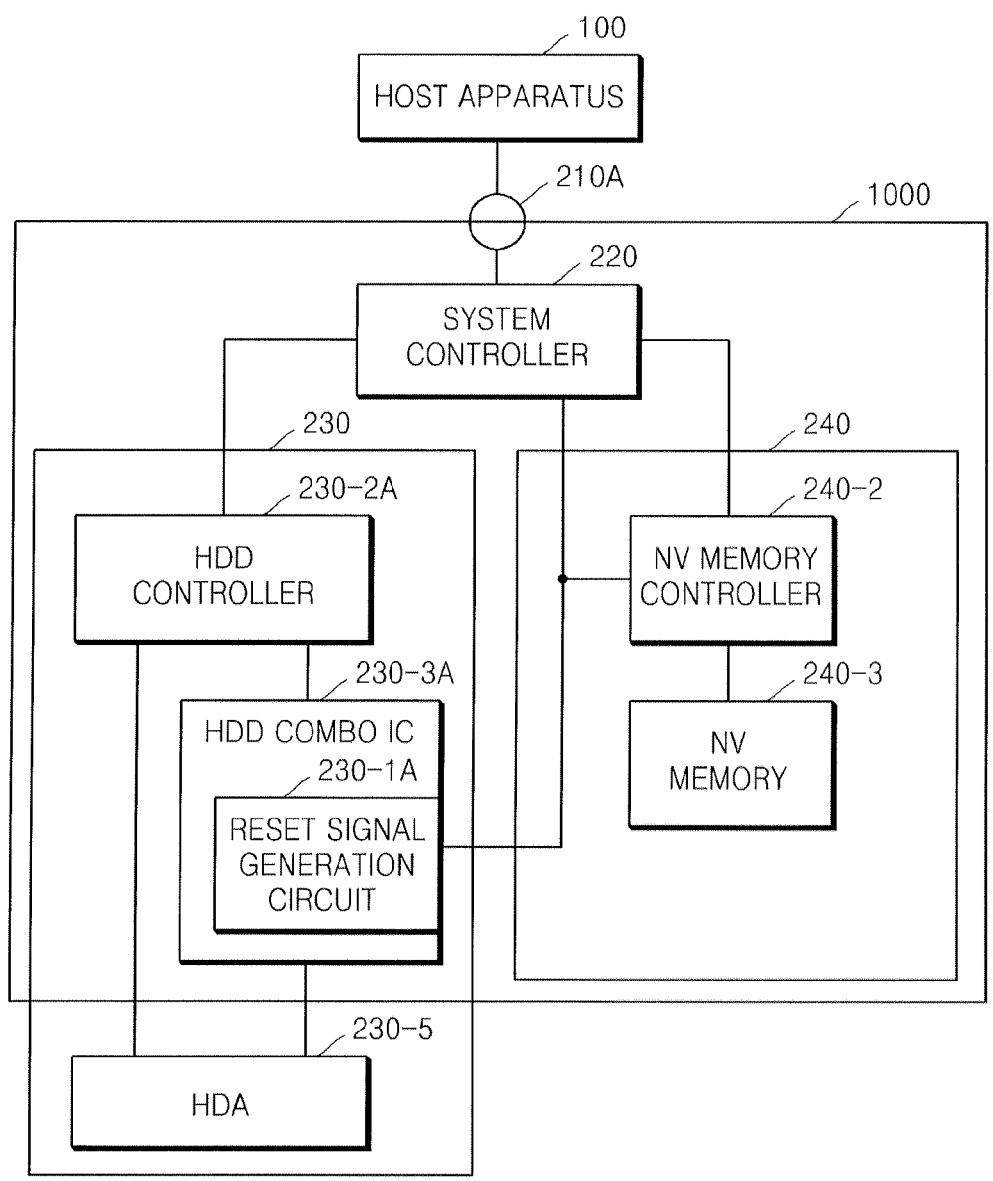
FIG. 7 is a block diagram illustrating a method of disposing components in a hybrid storage apparatus in order to share a reset signal, according to an embodiment of the present general inventive concept.

FIG. 7 is a block diagram illustrating a method of disposing components in a hybrid storage apparatus in order to share a reset signal, according to an embodiment of the present general inventive concept. As illustrated in FIG. 7, the hybrid storage apparatus 200 of FIG. 4 is designed such that circuit components thereof are arranged on a printed circuit board assembly (PCBA) 1000.

For example, a single host interface terminal 210A, a system controller 220 having a host interface therein, an HDD controller 230-2A, and a HDD combo integrated circuit (IC) 230-3A of a first storage device 230, which may be an HDD, and an NV memory controller 240-2 and an NV memory 240-3 of a second storage device 240 which may be an NV semiconductor memory device, are arranged on the PCBA 1000.

Here, the HDD controller 230-2A may include an R/W channel circuit (not illustrated), and the HDD combo IC 230-3A may include a reset signal generation circuit 230-1A and a motor drive circuit (not illustrated).

All the circuit components of the hybrid storage apparatus 200 except for an HDA 230-5 can be arranged on the PCBA 1000.

In the PCBA 1000, an output terminal of the reset signal generation circuit 230-1A of the HDD combo IC 230-3A is connected to a reset signal input terminal of the system controller 220 and a reset signal input terminal of the NV memory controller 240-2 via a connection unit, such as a pattern or wire, so that they are electrically connected to one another.

Figure 8:
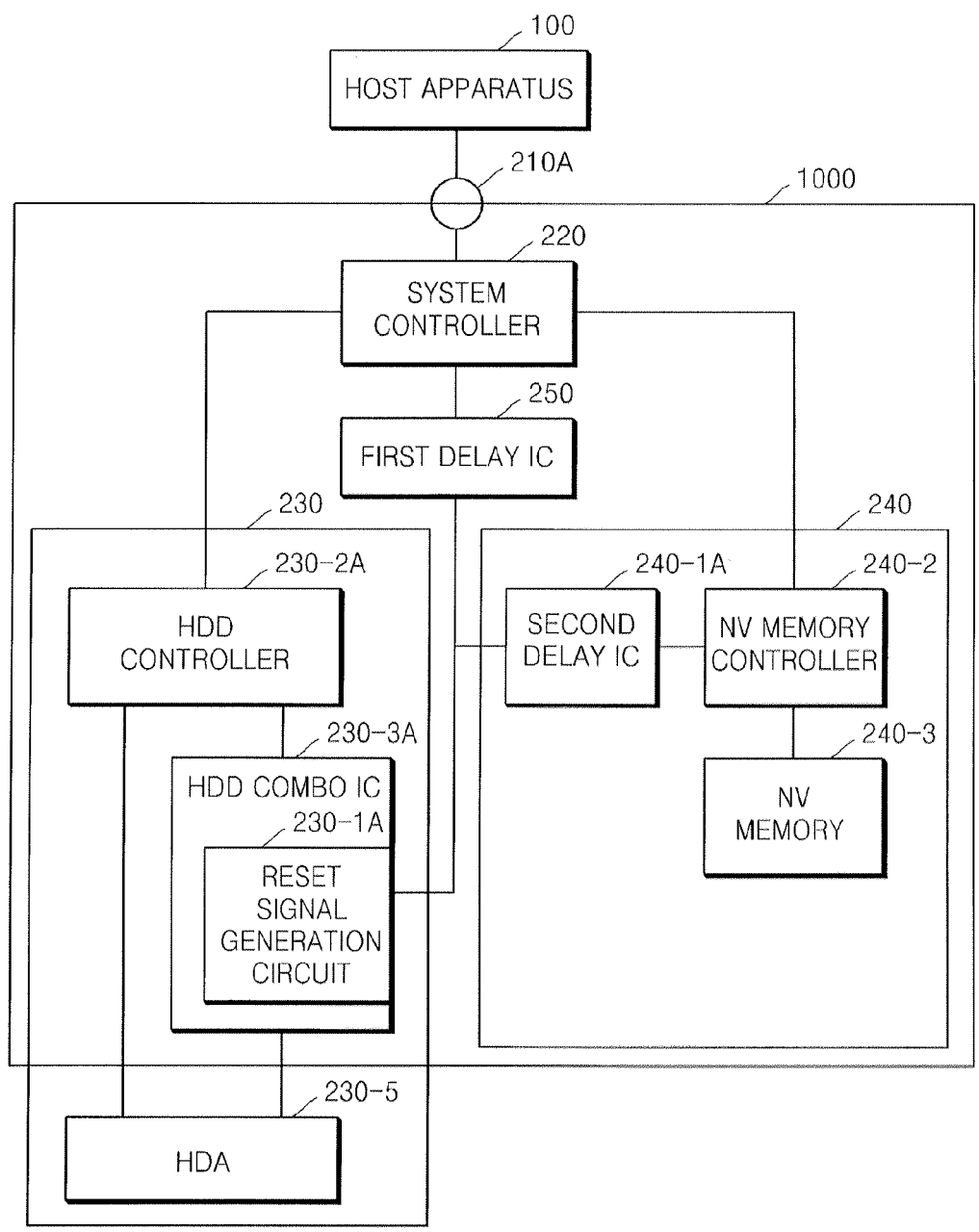
FIG. 8 is a block diagram illustrating a method of disposing components in a hybrid storage apparatus in order to share a reset signal, according to another embodiment of the present general inventive concept.

FIG. 8 is a block diagram illustrating a method of disposing components in a hybrid storage apparatus in order to share a reset signal, according to another embodiment of the present general inventive concept. As illustrated in FIG. 8, the hybrid storage apparatus 200 of FIG. 5 is designed such that circuit components thereof are arranged on a PCBA 1000.

For example, a single host interface terminal 210A, a system controller 220 including a host interface circuit therein, a first delay IC 250, an HDD controller 230-2A, and an HDD combo IC 230-3A of a first storage device 230, which may be an HDD, and a second delay IC 240-1A, an NV memory controller 240-2, and a NA memory 240-3 of a second storage device 240, which may be an NV semiconductor memory device 240, are arranged on the PCBA 1000.

Here, the HDD controller 230-2A may include an R/W channel circuit (not illustrated), and the HDD combo IC 230-3A may include a reset signal generation circuit 230-1A and a motor drive circuit (not illustrated).

All circuit components of the hybrid storage apparatus 200 except for an HDA 230-5 can be arranged on the PCBA 1000.

In the PCBA 1000, an output terminal of the reset signal generation circuit 230-1A of the HDD combo IC 230-3A is electrically connected to an input terminal of the first delay IC 250 and an output terminal of the first delay IC 250 is electrically connected to a reset signal input terminal of the system controller 220.

Also, an output terminal of the reset signal generation circuit 230-1A of the HDD combo IC 230-3A is electrically connected to an input terminal of the second delay IC 240-1A, and an output terminal of the second delay IC 240-1A is electrically connected to a reset signal input terminal of the NV memory controller 240-2.

While the present general inventive concept has been particularly illustrated and described with reference to exemplary embodiments thereof, it will be understood that various changes in form and details may be made therein without departing from the spirit and scope of the present general inventive concept.

Accordingly, although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A device comprising:
   a plurality of storage memory controllers to respectively control a plurality of storage memories that employ different writing methods;
   a system controller to exchange information with the storage memory controllers such that the plurality of storage memories are controlled in an integrated manner;
   a reset signal generation unit to output a reset signal when a power supply voltage is equal to or greater than a reference voltage; and
   a connection unit to transmit the reset signal from an output terminal of the reset signal generation unit to an input terminal of the system controller and from an output terminal of the reset signal generation unit to input terminals of the plurality of storage memory controllers without passing through the system controller.

2. The device of claim 1, wherein the plurality of storage memory controllers comprise a hard disc drive controller and a non-volatile memory controller.

3. The device of claim 1, wherein the reset signal generation unit generates the reset signal when a power supply voltage applied to the plurality of storage memory controllers and the system controller is equal to or greater than a first predetermined reference voltage and when a power supply voltage applied to a motor drive circuit used in one of the plurality of storage memories is equal to or greater than a second predetermined reference voltage.

4. The device of claim 1, wherein the reset signal generation unit comprises:
   a comparator to compare a power supply voltage that is commonly applied to the plurality of storage memory controllers and the system controller to the reference voltage, and to generate the reset signal when the power supply voltage is equal to or greater than the reference voltage; and
   a delayer to delay the reset signal received from the comparator for a predetermined time, and to output the delayed reset signal.

5. The device of claim 1, wherein the reset signal generation unit comprises:
   a first comparator to generate a first signal that is in a first logic state when a power supply voltage that is applied to the plurality of storage memory controllers and the system controller is equal to or greater than a first reference voltage;
   a first delayer to delay the first signal received from the first comparator for a first predetermined time, and to output the delayed first signal;
   a second comparator to generate a second signal that is in the first logic state only when a power supply voltage applied to a motor drive circuit in one of the plurality of storage memories is equal to or greater than a second reference voltage;
   a second delayer to delay the second signal received from the second comparator for a second predetermined time and to output the delayed second signal; and
   an AND gate circuit to output a reset signal when both the first signal and the second signal are in the first logic state.

6. The device of claim 1, further comprising:
   a delay circuit included between an output terminal of the reset signal generation unit and reset signal input terminals of the system controller and the plurality of storage memory controllers, the delay circuit configured to:
   delay a rising period of the reset signal based on a longest ready-time among the system controller and the plurality of storage memory controllers.

7. The device of claim 6, further comprising:
   the delay circuit configured to delay a falling period of the reset signal for as short a time as possible and for less time than the delay of the rising period.

8. The device of claim 1, further comprising a printed circuit board assembly including the reset signal generation unit disposed in an integrated circuit of one storage memories unit from among the plurality of storage memories, and wherein the integrated circuit includes a reset signal output terminal electrically connected to reset signal input terminals of the plurality of storage memory controllers.

9. The device of claim 8, further comprising a delay circuit between the reset signal output terminal of the integrated circuit and the reset signal input terminals of the plurality of storage memory controllers.

10. The device of claim 8, further comprising the reset signal generation unit disposed in an integrated circuit of a storage memory with a controller having a shortest ready-time among the plurality of storage memory controllers.

11. The device of claim 1, further comprising:
    the plurality of storage memory controllers and the system controller operating at different operating voltages; and
    the reset signal generation unit configured to output the reset signal when the power supply voltage is equal to or greater than the reference voltage, and the reference voltage is sufficient for a highest operating voltage among the plurality of storage memory controllers and the system controller.

12. An apparatus comprising:
    a plurality of storage devices having different data writing methods;
    a system controller to communicate commands from a host device to the plurality of storage devices, the system controller and plurality of storage devices having different operating voltages; and
    a reset signal generation unit to simultaneously apply a reset signal to the plurality of storage devices and the system controller to perform a command with respect to one of the plurality of storage devices when a power supply voltage is equal to or greater than a reference voltage that is equal to or greater than a highest operating voltage among the plurality of storage devices and the system controller.

13. The apparatus of claim 12, wherein the reset signal generation unit comprises:
    a comparator to compare a power supply voltage commonly applied to the plurality of storage devices and the system controller to the reference voltage and to generate the reset signal when the power supply voltage is equal to or greater than the reference voltage; and a delayer to delay the reset signal applied to the plurality of storage devices and the system controller according to a ready-time of the plurality of storage devices and the system controller.

14. The apparatus of claim 12, further comprising:
a first delayer to delay the reset signal applied to the system controller according to a ready-time of the system controller; and
a second delayer to delay the reset signal applied to one or more storage devices according to a ready-time of the one or more storage devices.

15. The apparatus of claim 12, wherein the reset signal generation unit comprises:
a first comparator to generate a first signal having a first logic state when a first power supply voltage, that is commonly applied to the plurality of storage devices and the system controller, is equal to or greater than a first reference voltage;
a second comparator to generate a second signal having a second logic state when the second power supply voltage, that is applied to a motor drive circuit of one of the storage devices, is equal to or greater than a second reference voltage; and
a gate circuit to receive the first and second signals and to output the reset signal to the plurality of storage devices and the system controller when the first logic state is the same as the second logic state.

16. A method comprising:
communicating read or write commands from a host device to a plurality of storage devices having different read or write methods; and
simultaneously applying a reset signal to the plurality of storage devices and a system controller to carry out the read or write command from the host device when a power supply voltage is equal to or greater than a reference voltage that is sufficient to power a highest operating voltage selected from the the plurality of storage devices and the system controller.

17. The method of claim 16, wherein the simultaneously applying the reset signal comprises:
comparing the power supply voltage commonly applied to the plurality of storage devices and the system controller to the reference voltage;
generating the reset signal when the power supply voltage is equal to or greater than the reference voltage; and
delaying the reset signal applied to the plurality of storage devices and the system controller according to a ready-time of the plurality of storage devices and the system controller.

18. The method of claim 16, further comprising:
delaying the reset signal applied to the system controller according to a ready-time of the system controller; and
delaying the reset signal applied to the plurality of storage devices according to ready times of the plurality of storage devices.

19. The method of claim 16, wherein the simultaneously applying the reset signal comprises:
comparing a first power supply voltage commonly applied to the plurality of storage devices and the system controller to a first reference voltage to generate a first signal having a first logic state when the first power supply voltage is equal to or greater than the first reference voltage;
comparing a second power supply voltage applied to a motor drive circuit of one of the storage devices to a second reference voltage to generate a second signal having a second logic state when the second power supply voltage is equal to or greater than the second reference voltage; and
applying the reset signal to the plurality of storage devices and the system controller when the first logic state is the same as the second logic state.

20. A system comprising:
a storage device including a hard disc drive (HDD) and a non-volatile (NV) solid state memory;
a system controller to communicate read or write commands to the HDD and NV solid state memory; and
a single reset signal generation unit to simultaneously apply a reset signal to the system controller, HDDU, and NV solid state memory based on ready times of the HDD and the NV memory.

* * * * *